(12) United States Patent
Flaherty

(10) Patent No.: US 9,376,064 B2
(45) Date of Patent: Jun. 28, 2016

(54) SHOCK DAMPENING PROTECTOR FOR A BICYCLE WHEEL RIM

(71) Applicant: Thule Sweden AB, Hillerstorp (SE)

(72) Inventor: Joseph R. Flaherty, Prospect, CT (US)

(73) Assignee: Thule Sweden AB, Hillerstorp (SE)

( * ) Notice: Subject to any disclaimer, the term of this patent is extended or adjusted under 35 U.S.C. 154(b) by 39 days.

(21) Appl. No.: 14/023,324

(22) Filed: Sep. 10, 2013

(65) Prior Publication Data

US 2014/0069975 A1   Mar. 13, 2014

Related U.S. Application Data

(60) Provisional application No. 61/699,771, filed on Sep. 11, 2012.

(51) Int. Cl.
*F16F 7/00* (2006.01)
*B60R 9/10* (2006.01)
*B60P 7/08* (2006.01)

(52) U.S. Cl.
CPC .................. *B60R 9/10* (2013.01); *B60P 7/0869* (2013.01); *F16F 7/00* (2013.01)

(58) Field of Classification Search
CPC ........................................................ B60R 9/10
USPC ........ 224/572, 318, 324, 42.12, 42.13, 42.18, 224/42.19, 42.26, 42.39, 924
See application file for complete search history.

(56) References Cited

U.S. PATENT DOCUMENTS

| | | | | |
|---|---|---|---|---|
| 3,883,053 A * | 5/1975 | Pritchard et al. | ............ | 224/264 |
| 4,232,808 A * | 11/1980 | Gray | ............................ | 224/610 |
| 4,401,246 A * | 8/1983 | Dickinson et al. | ............ | 224/150 |
| 4,442,961 A * | 4/1984 | Bott | ............................... | 224/570 |
| 4,887,318 A * | 12/1989 | Weinreb | ............................. | 2/268 |
| 4,942,995 A * | 7/1990 | Myers | .................... | A45C 13/30 |
| | | | | 224/257 |
| 5,018,652 A * | 5/1991 | Holtzclaw, Jr. | ........ | F41C 33/001 |
| | | | | 224/150 |
| 5,038,984 A * | 8/1991 | Izzo | ............................... | 224/643 |
| 5,203,482 A * | 4/1993 | Puff | ............................... | 224/257 |
| 5,230,449 A * | 7/1993 | Collins et al. | .................. | 224/493 |
| 5,250,345 A * | 10/1993 | Chu | .......................... | A45F 3/12 |
| | | | | 2/268 |
| 5,292,044 A * | 3/1994 | Reimers | ......................... | 224/264 |
| 5,497,927 A * | 3/1996 | Peterson | ........................ | 224/519 |
| 5,566,871 A * | 10/1996 | Weintraub | ..................... | 224/264 |
| 5,590,826 A * | 1/1997 | Endo | .............................. | 224/264 |
| 5,595,332 A * | 1/1997 | Freedman | ...................... | 224/264 |
| 5,695,102 A * | 12/1997 | Jackson | ......................... | 224/264 |
| 5,749,694 A * | 5/1998 | Ackerman et al. | ............ | 414/462 |
| 6,223,959 B1 * | 5/2001 | Chen | .............................. | 224/264 |
| 6,279,795 B1 * | 8/2001 | Pierzina | .................... | A45F 3/12 |
| | | | | 224/150 |
| 6,283,310 B1 * | 9/2001 | Dean et al. | ........................ | 211/20 |
| 6,318,609 B1 * | 11/2001 | Swierz | ............................ | 224/264 |
| 6,481,022 B1 * | 11/2002 | D'Addario | ................. | A45F 3/12 |
| | | | | 2/268 |
| 6,616,023 B1 * | 9/2003 | Dahl et al. | ...................... | 224/537 |
| 6,910,227 B2 * | 6/2005 | Lee | .......................... | A45C 13/30 |
| | | | | 2/268 |
| 6,988,645 B1 * | 1/2006 | Nusbaum et al. | ............. | 224/519 |
| 7,000,812 B2 * | 2/2006 | Gilstrap et al. | ............... | 224/426 |

(Continued)

*Primary Examiner* — Brian D Nash
(74) *Attorney, Agent, or Firm* — Sterne, Kessler, Goldstein & Fox P.L.L.C.

(57) ABSTRACT

A securement device with a protecting element which engages, at least in part, a surface of the item secured and provides shock absorption, vibration lessening and surface protection to the item secured. The securement device may include a strap adjustably coupled to a bicycle rack so as to secure a wheel of a bicycle to the rack and provide shock absorption, vibration lessening and surface protecting to the wheel and wheel rim.

13 Claims, 3 Drawing Sheets

(56) References Cited

U.S. PATENT DOCUMENTS

| | | | |
|---|---|---|---|
| 7,004,363 B2 * | 2/2006 | Fenton et al. | 224/264 |
| 7,367,483 B2 * | 5/2008 | Nassanian | A45F 3/12 224/264 |
| D608,723 S * | 1/2010 | Flaherty et al. | D12/408 |
| D612,320 S * | 3/2010 | Flaherty et al. | D12/408 |
| D646,895 S * | 10/2011 | Nolan | A45F 3/12 D3/327 |
| 8,348,113 B2 * | 1/2013 | Huang | 224/567 |
| 2005/0258205 A1 * | 11/2005 | French | 224/264 |
| 2005/0279798 A1 * | 12/2005 | Nassanian | 224/643 |
| 2007/0057001 A1 * | 3/2007 | Wang | 224/536 |
| 2007/0262106 A1 * | 11/2007 | Fidrych et al. | 224/264 |
| 2008/0006661 A1 * | 1/2008 | Godshaw et al. | 224/264 |
| 2008/0164292 A1 * | 7/2008 | Farney | 224/324 |
| 2010/0320243 A1 * | 12/2010 | Hassan | 224/264 |
| 2011/0042430 A1 * | 2/2011 | Scicluna | 224/264 |
| 2011/0068138 A1 * | 3/2011 | Flaherty et al. | 224/324 |
| 2012/0121210 A1 * | 5/2012 | Meyer et al. | 383/4 |

* cited by examiner

SHOCK DAMPENING PROTECTOR FOR A BICYCLE WHEEL RIM

CROSS-REFERENCE TO RELATED APPLICATION

This application claims priority to U.S. application No. 61/699,771, filed Sep. 11, 2012, the contents of which are entirely incorporated by reference herein.

FIELD OF THE DISCLOSURE

The instant disclosure relates to transport carriers. In particular, the disclosure relates to securement devices that lessen shock and vibration forces transmitted to items secured to transport carriers, as well as protects the surface of secured items at the point of securement.

BACKGROUND

Transportation of equipment or items, especially sports equipment, such as one or more bicycles, often involves securing the equipment or items to a vehicle. The equipment or items may be secured directly to the vehicle or, more often, may be secured to a load carrier affixed to the vehicle.

While transporting the equipment or items, the vehicle often experiences vibration which may be transmitted to the equipment or items, directly or through the load carrier. Moreover, the vehicle may often encounter uneven driving or other conditions which may cause the equipment or item to be subjected to abrupt movement causing stress or shock which also may be transmitted to any equipment or item directly or through the load carrier.

In either case, the stress or vibration transmitted to the equipment or item can, at least in part, be affected by the securement device used to secure the equipment or item to the vehicle or the load carrier. These transmitted forces may, over the course of use of the securement device, cause damage or impairment to the equipment or item being secured. The damage to the equipment or item secured may be structural or may include damage to the surface of the secured equipment or item at the point of securement or contact. Both structural and surface damage to the secured item is undesirable and may, depending on what is secured, be costly.

Thus, a securement device that lessens at least some of the shock or vibration to which the equipment is subjected to while secured to the vehicle or load carrier is desirable. Likewise, a securement device that provides at least some protection to the surface of the equipment while secured to the vehicle or load carrier is also desirable.

BRIEF DESCRIPTION OF THE DRAWINGS

Implementation of the present application will now be described, by way of example only, with reference to the attached Figures, wherein.

DETAILED DESCRIPTION

Figure 1A:
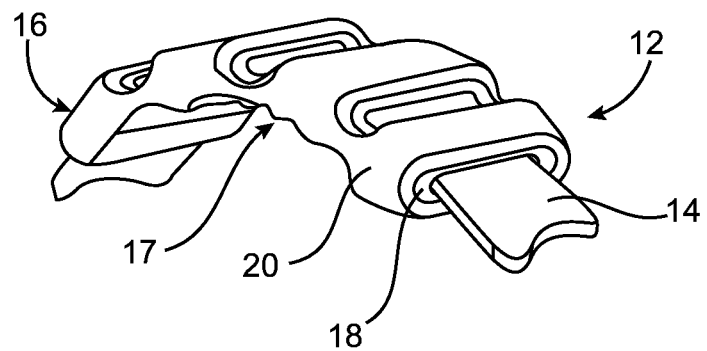
FIG. 1a is a perspective view of a surface protecting securement device in accordance with an exemplary implementation.

It will be appreciated that for simplicity and clarity of illustration, where appropriate, reference numerals have been repeated among different Figures to indicate corresponding or analogous elements. In addition, numerous specific details are set forth in order to provide a thorough understanding of the implementation described herein. However, it will be understood that the implementation described herein can be practiced without these specific details. In other instances, methods, procedures and components have not been described in detail so as not to obscure the related relevant function being described. Also, the description is not to be considered as limiting the scope of the implementations described herein.

The present disclosure presents a retaining strap for securing a bicycle wheel to a load carrier. The retaining strap may include a flexible band element adjustably positionable and tightenable about a portion of the wheel. The retaining strap may also include a protecting element coupled to the band so that, when the wheel is secured, at least a portion of the protecting element is biased against a portion of the surface of the wheel rim. The protecting element is made, at least in part, of resilient force responsive material so that when biased towards a portion of the wheel rim, the material absorbs or lessens the shock from the load carrier providing protection for the surface of the wheel rim. The securement device may be implemented on a variety of load carriers. The example presented herein and shown in the illustrations is directed to a bicycle wheel secured on a load carrier mount on a carrying vehicle. The securement device could be positioned elsewhere against the bicycle and still retain the bicycle in the load carrier and provide shock absorption for the bicycle and surface protection for the surface that the protecting element engages. Furthermore, the shock absorbing or shock lessening and surface protecting securement device as described herein may be implemented to provide shock absorption and surface protection for other non-bicycle items secured to a vehicle in motion or in other environments in which a shock absorbing and surface protecting securement device maybe desirable.

Figure 1B:
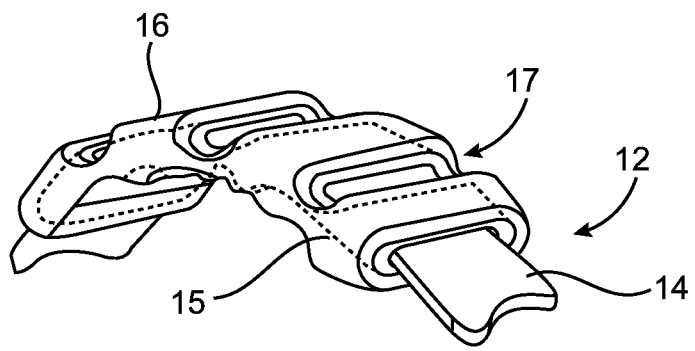
FIG. 1b is a perspective view of the surface protecting securement device of FIG. 1a, but additionally showing in phantom an interior channel through which securement strap or band can be inserted.

FIG. 1 illustrates a partial perspective view of a shock absorbing, vibration dampening and surface protecting securement device 12. The securement device 12 includes an adjustable and tightenable band element 14 and protecting element 16 coupled to the band element 14. The protecting element 16 may be coupled to the band element 14 by any means known in the art, such as, but not limited to, adhesive, friction or mechanical means. In some embodiments, the band element 14 may include one or more voids through which a portion of the protecting element may extend. In other embodiments, the band element may include one or more protrusions, optionally through gap spaces, that engage the protecting element.

The protecting element shown in FIG. 1 includes an inner core section 18 and shell section 20. The protecting element 16 may, however, be a solid element (See FIG. 2) or include additional sections, portions, pieces or elements. The band element 14 in FIG. 1 is shown extending longitudinally through an interior channel 15 of the protecting element 16. The band element 14 may in some embodiments extend laterally through the protecting element 16. In other embodiments the band element 14 may extend, either longitudinally or laterally, through only a portion of the protecting element 16 or the protecting element 16 may be positioned entirely on one side of the band element 14.

The protecting element 16 may be, in its entirety, made of a shock absorbing material or, if the protecting element 16 consists of a core 18 and a shell 20, the core may be made of a shock absorbing material or the shell may be made of a shock absorbing material.

Figure 5:
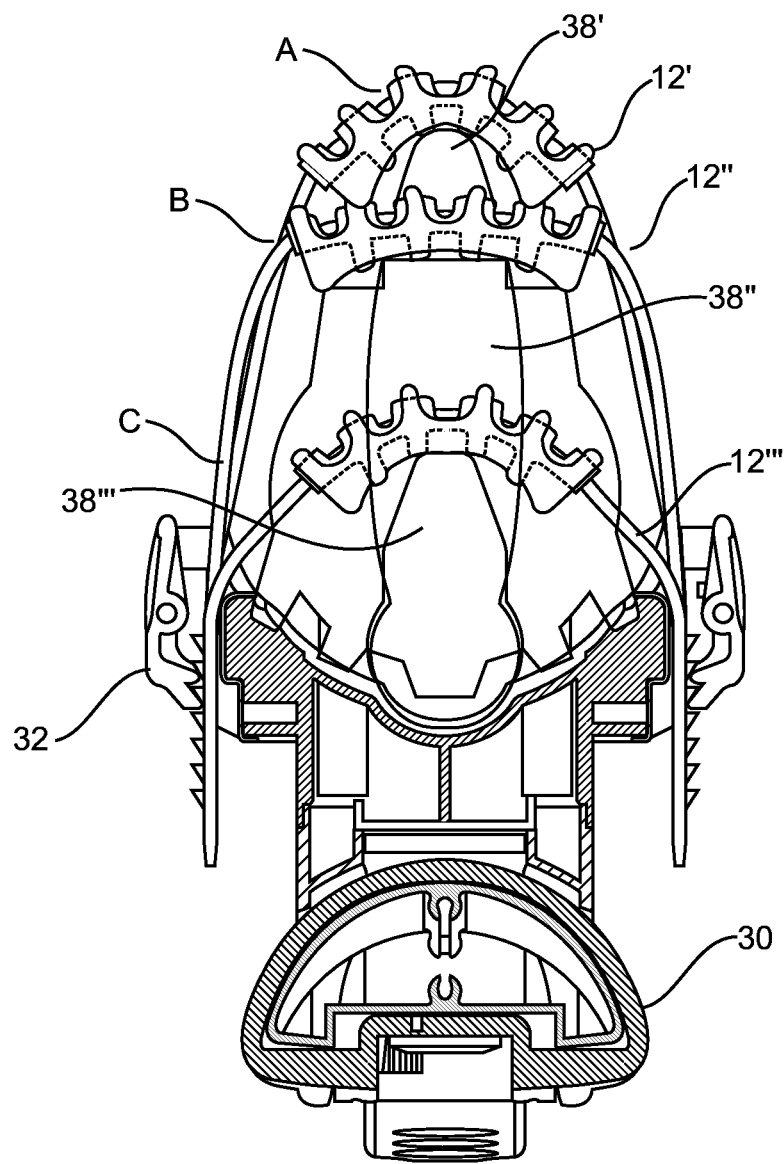
FIG. 5 is a partial cutaway view showing portions of a load carrier in cross-section with three differently configured bicycle wheel demonstrating the flexibility and versatility of the protecting element when secured thereabout on a securement strap.

As may be best appreciated in FIG. 5, the shell 20 can be provided with one or more gap spaces through which portions of the core 18 extend to provide one or more buffering protrusions that engage the wheel rim 38. In at least one embodiment, the shell 20 is manufactured from a material that is harder than the material from which the core 18 is manufactured. In this way, the protecting element 16 can be made strong by way of the tougher shell 20, while at the same time providing a sufficiently resilient buffer by way of the protrusions of softer core material 18. As an example, the shell 20 and core 18 may each be constructed from a rubber/plastic-like material such as Thermo-Plastic Elastomer, or TPE. To provide sufficient rigidity and strength, the shell 20 will advantageously be constructed from a higher durometer material having a hardness greater than about 70 shore A. To provide sufficient buffering capacity, the core 18 will advantageously be constructed from a lower durometer material having a hardness less than about 65 shore A.

Figure 2:
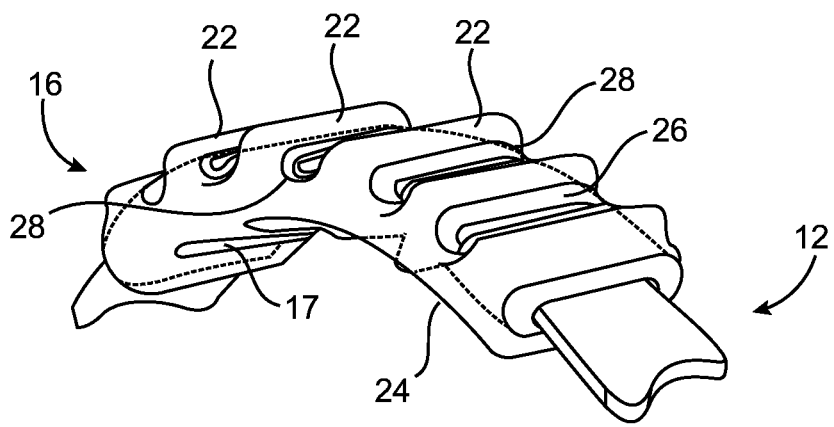
FIG. 2 is a perspective view of an alternative design of the surface protecting securement device that is constructed monolithically and in accordance with an exemplary implementation.

FIG. 2 illustrates a partial perspective view of a different embodiment of the shock absorbing, vibration dampening and surface protecting securement device shown in FIG. 1. The protecting element 16 of FIG. 2 is a single-piece element. The protecting element 16 includes extended deflectable protrusions or ridges 22 extending outward from the protecting element 16. The ridges 22 shown in FIG. 2 are positioned cross-wise on the protecting element 16. In FIG. 2, the ridges 22 extend outward from the first or inner surface 24 (not shown in FIG. 2) of the protecting element similar to that which is shown with respect to the second or outer surface 26 of the protecting element. The protecting element of FIG. 2 is shown with voids 28 substantially positioned between the ridges 22. The protecting element could however be configured without voids or with voids 28 only between certain ridges 22.

The protecting element 16 shown in FIG. 2 could be made up entirely of shock absorbing or deflectable material. Alternatively, the ridges 22 can be made of a first shock absorbing deflectable material and the rest of the protecting element 16 can be made of a second material.

Figure 3:
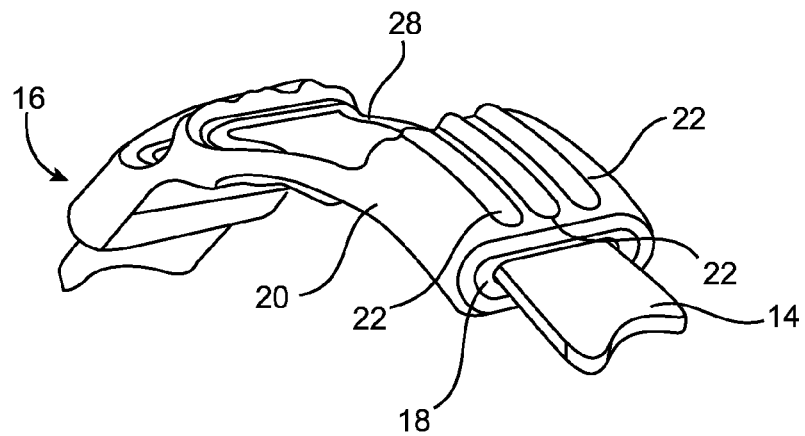
FIG. 3 is a perspective view of another alternative design of the surface protecting securement device having longitudinal ridges or protrusions.

FIG. 3 illustrates a partial perspective view of a different embodiment of the shock absorbing, vibration dampening and surface protecting device from those shown in FIGS. 1 and 2. The protecting element 16 of FIG. 3 shows the ridges 22 extending longitudinally and in parallel with the band element 14. The protecting element of FIG. 3 includes a shell section 20 and a core section 18 with only a single void 28 on the outer surface 26 of the protecting element 16.

It will be clear that the deflectable ridges 22 shown positioned longitudinally in FIG. 3 and cross-wise in FIG. 2 could be positioned in various ways, such as at an angle to the longitudinal axis of the band element 14. Moreover, the protrusions 22 may be configured in other shapes such as, but not limited to deflectable fingers, nubs or the like.

Figure 4:
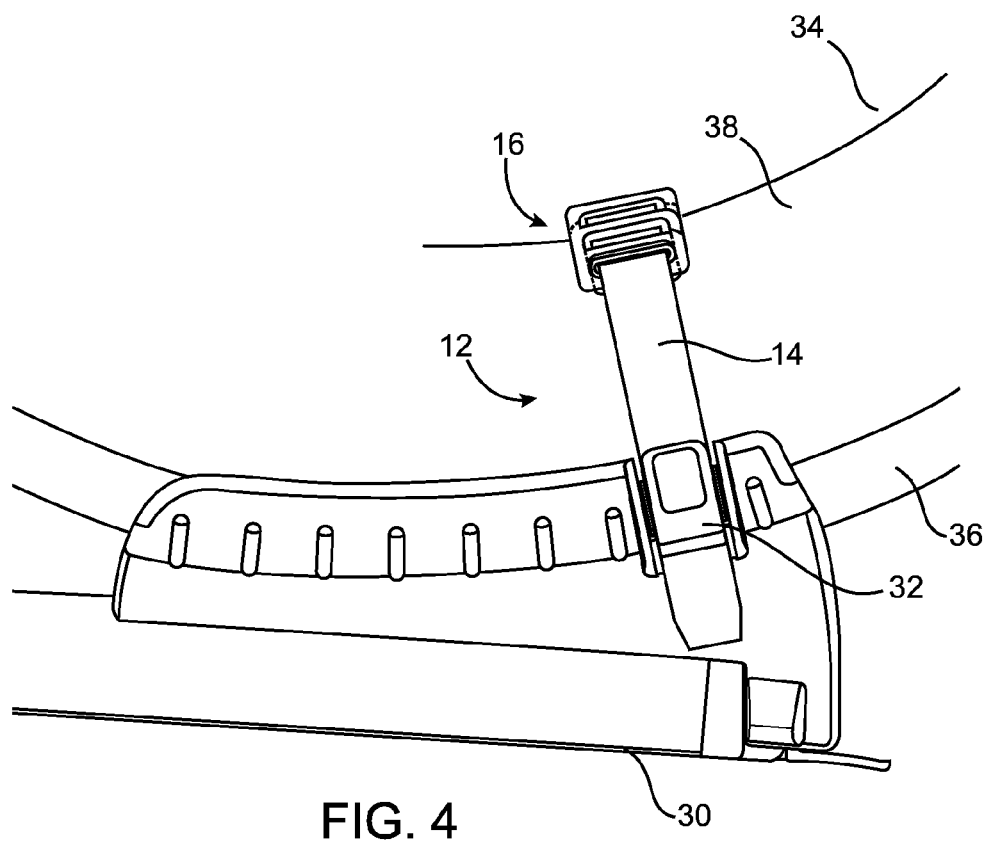
FIG. 4 is a side elevation view showing a bicycle wheel having a rim and tire secured in the wheel tray of a carrier with a surface protecting securement device secured thereabout.

FIG. 4 is a side elevational view of the securement device in use. The securement device 12 is adjustably positionable and tightenable about a wheel 34. The securement device 12 is attached to a load carrier 30 by the clasp 32 and secures the wheel 34 to the load carrier 30. The wheel 34 has a tire portion 36 and a rim portion 38.

As seen in FIG. 4 the protecting element 16 is positioned against the rim portion 38 of the wheel 34 allowing the securement device 12 to absorb shock and dampen vibration from the load carrier 30, protecting the wheel 34. In particular, the deflectable material and the deflectable protrusion of the protecting element 16 absorb the shock and dampen the vibration that may transmit from the load carrier 30 through the strap 14 in the securement device 12 to the wheel rim 38.

FIG. 5 is a cross sectional view of the securement device in use and showing multiple alternative positions for the securement device. In particular, FIG. 5 shows load carrier 30 and clasps 32 coupling the securement device 12 as shown in three alternative positions: A, B, C, with each position showing securement of a different sized bicycle wheel rim 38.

Position A shows the securement device 12' securing a wheel rim 38' with a larger cross sectional sized tire/rim combination. Position B shows securement device 12' securing a wheel rim 39' with a medium sized cross sectional tire/rim combination. Position C shows a securement device 12''' securing a wheel rim 38''' with a smaller sized cross sectional tire/rim combination.

The tire/rim combinations and positions shown in FIG. 5 are exemplary only and one skilled in the art will recognize that the securement device will function across a range of tire/rim size combination as well as secure other items of various sizes.

Exemplary implementation has been described hereinabove regarding the implementation of a securement device. Various modifications to and departures from the disclosed implementation will occur to those having skill in the art. The subject matter that is intended to be within the spirit of this disclosure is set forth in the following claims.

What is claimed is:

1. A strap for retaining a bicycle on a load carrier, the strap comprising:
    a flexible band element configured to be adjustably positioned over and tightened about a portion of a wheel rim of the bicycle to secure the bicycle to the load carrier; and
    a shock absorbing protecting element comprising a body having an outer side and an inner side, the protecting element slidingly coupled to the band element and configured to slide along a length of the band element while coupled to the band element,
    wherein the protecting element is configured so that the inner side of the protecting element is positioned between a portion of the band element and a portion of the wheel rim and configured to contact the wheel rim of the bicycle to absorb at least a portion of any shock associated with the bicycle being retained on the load carrier by the strap, and
    wherein the protecting element includes at least three extended deflectable finger-like protrusions extending outward from the outer side of the protecting element body.

2. The strap recited in claim 1, wherein the band element is lengthwise adjustably attached to the load carrier.

3. The strap recited in claim 1, wherein the protecting element comprises:
   a core section; and
   a shell section substantially encircling the core section and wherein at least a portion of at least one of the core section and the shell section is comprised of a shock absorbing material.

4. The strap recited in claim 3, wherein the shell section includes a first side and a second side, the first side having an outer face and an inner face, and wherein when the bicycle is secured on the load carrier by the strap, a portion of the outer face of the first side faces the wheel rim of the bicycle to absorb at least a portion of any shock associated with the bicycle being retained on the load carrier by the strap.

5. The strap recited in claim 4, wherein the second side of the shell section is substantially parallel to the first side and has at least one gap space therethrough.

6. The strap recited in claim 3, wherein the shell section is configured to form at least one protrusion gap and the core section comprises at least one deflectable protrusion that extends through the at least one protrusion gap, and wherein the at least one deflectable protrusion is configured to contact the wheel rim surface and absorb at least a portion of any shock associated with the bicycle being retained on the load carrier by the strap.

7. The strap recited in claim 6, wherein at least a portion of the shell section of the protecting element is made of a first material and at least a portion of the at least one deflectable protrusion extending from the core section is made of a second, more flexible material.

8. A bicycle surface protection article, comprising: a shock absorbing protection element comprising a body having an outer side and an inner side, the protection element configured to be coupled to a bicycle rack retaining strap and configured to slide along a length of the strap while coupled to the strap, wherein the inner side of the protection element is positioned between the strap and a portion of a wheel of a bicycle to absorb at least a portion of any shock associated with the bicycle rack retaining strap securing the wheel to a bicycle rack, wherein the protection element includes at least four extended deflectable finger-like protrusions extending across a width of the outer side of the protection element body, and wherein the retaining strap is configured to secure the wheel to the bicycle rack.

9. The surface protection article recited in claim 8, wherein the protection element comprises:
   a core section; and
   a shell section substantially encircling the core section and wherein at least a portion of at least one of the core section and the shell section is comprised of a shock absorbing material.

10. The surface protection article recited in claim 9, wherein the shell section includes a first side and a second side, the first side having an outer face and an inner face, and wherein when the bicycle is retained in the rack, a portion of the outer face of the first side of the shell section faces a surface of a rim of the wheel and absorbs at least a portion of any shock associated with the bicycle rack retaining strap securing the wheel to a bicycle rack.

11. The surface protection article of claim 10, wherein the shell section is configured to form at least one protrusion gap and the core section comprises at least one deflectable protrusion that extends through the at least one protrusion gap, and wherein the at least one deflectable protrusion is configured to contact with the rim surface and to absorb at least a portion of any shock associated with the bicycle being retained on the rack.

12. The surface protection article of claim 11, wherein at least a portion of the shell section of the protecting element is made of a first material and at least a portion of the at least one deflectable protrusion extending from the core section is made of a second, more flexible material.

13. The surface protection article of claim 10, wherein the second side of the shell section is substantially parallel to the first side and has at least one gap space therethrough.

\* \* \* \* \*